United States Patent
Phadnis

(10) Patent No.: US 9,900,656 B2
(45) Date of Patent: Feb. 20, 2018

(54) METHOD AND SYSTEM FOR CUSTOMER MANAGEMENT

(71) Applicant: What's On India Media Private Limited, Lower Parel, Mumbai (IN)

(72) Inventor: Atul Phadnis, Mumbai (IN)

(73) Assignee: WHATS ON INDIA MEDIA PRIVATE LIMITED, Mumbai (IN)

( * ) Notice: Subject to any disclaimer, the term of this patent is extended or adjusted under 35 U.S.C. 154(b) by 0 days.

(21) Appl. No.: 15/300,887

(22) PCT Filed: Apr. 6, 2015

(86) PCT No.: PCT/IN2015/000161
§ 371 (c)(1),
(2) Date: Sep. 30, 2016

(87) PCT Pub. No.: WO2015/159303
PCT Pub. Date: Oct. 22, 2015

(65) Prior Publication Data
US 2017/0026703 A1    Jan. 26, 2017

(30) Foreign Application Priority Data

Apr. 2, 2014 (IN) .......................... 1259/MUM/2014

(51) Int. Cl.
*H04H 60/32* (2008.01)
*H04N 21/442* (2011.01)
(Continued)

(52) U.S. Cl.
CPC ....... *H04N 21/44222* (2013.01); *G06Q 30/01* (2013.01); *G06Q 30/02* (2013.01);
(Continued)

(58) Field of Classification Search
CPC .......... H04N 21/44222; H04N 21/812; H04N 21/4532; H04N 21/4788; H04N 21/4828; H04N 21/6587
(Continued)

(56) References Cited

U.S. PATENT DOCUMENTS

| | | |
|---|---|---|
| 5,534,911 A | 7/1996 | Levitan |
| 5,973,683 A | 10/1999 | Cragun et al. |

(Continued)

FOREIGN PATENT DOCUMENTS

| | | |
|---|---|---|
| EP | 0755154 | 1/1997 |
| WO | 9901984 | 1/1999 |

(Continued)

OTHER PUBLICATIONS

International Search Report and Written Opinion for Int. App. No. PCT/IN2015/000161, dated Mar. 1, 2016.
(Continued)

*Primary Examiner* — Michael B Pierorazio
(74) *Attorney, Agent, or Firm* — Hanley, Flight & Zimmerman, LLC

(57) ABSTRACT

A method and system for customer management is disclosed. The method and system enhance a television service provider's ability to sell television channels and channel packages to users. The system and method disclosed herein enables a user to receive recommendations for one or more television channels and/or channel packages based on one or more television viewing activities of the user, social media activity of the user, and social media activity of other users.

20 Claims, 9 Drawing Sheets

(51) Int. Cl.
  *G06Q 30/02* (2012.01)
  *G06Q 30/00* (2012.01)
  *G06Q 50/00* (2012.01)
  *H04N 21/45* (2011.01)
  *H04N 21/4788* (2011.01)
  *H04N 21/482* (2011.01)
  *H04N 21/6587* (2011.01)
  *H04N 21/81* (2011.01)

(52) U.S. Cl.
  CPC ..... *G06Q 30/0255* (2013.01); *G06Q 30/0269* (2013.01); *G06Q 50/01* (2013.01); *H04N 21/4532* (2013.01); *H04N 21/4788* (2013.01); *H04N 21/4828* (2013.01); *H04N 21/6587* (2013.01); *H04N 21/812* (2013.01)

(58) Field of Classification Search
  USPC .......................................................... 725/14
  See application file for complete search history.

(56) References Cited

U.S. PATENT DOCUMENTS

| | | | |
|---|---|---|---|
| 6,020,883 | A | 2/2000 | Herz et al. |
| 7,337,458 | B2 | 2/2008 | Michelitsch et al. |
| 8,275,764 | B2 | 9/2012 | Jeon et al. |
| 8,745,047 | B2 | 6/2014 | Fein et al. |
| 9,172,915 | B2 | 10/2015 | Nicholas et al. |
| 9,215,423 | B2 | 12/2015 | Kimble et al. |
| 9,230,212 | B2 | 1/2016 | Su |
| 9,241,136 | B2 | 1/2016 | Busse et al. |
| 9,256,652 | B2 | 2/2016 | Korbecki et al. |
| 9,396,492 | B2 | 7/2016 | Schiff et al. |
| 9,460,092 | B2 | 10/2016 | Murphy et al. |
| 9,473,730 | B1 | 10/2016 | Roy et al. |
| 9,584,868 | B2 | 2/2017 | Diaz Perez |
| 9,654,721 | B2 | 5/2017 | Ruiz-Velasco et al. |
| 2002/0151327 | A1 | 10/2002 | Levitt |
| 2003/0084450 | A1 | 5/2003 | Thurston et al. |
| 2004/0044677 | A1 | 3/2004 | Huper-Graff et al. |
| 2006/0059260 | A1 | 3/2006 | Kelly et al. |
| 2007/0011702 | A1 | 1/2007 | Vaysman |
| 2007/0124756 | A1* | 5/2007 | Covell .............. G06F 17/30743 725/18 |
| 2007/0156589 | A1 | 7/2007 | Zimler et al. |
| 2007/0250863 | A1 | 10/2007 | Ferguson |
| 2008/0082510 | A1* | 4/2008 | Wang ...................... H04H 60/37 |
| 2008/0134043 | A1 | 6/2008 | Georgis et al. |
| 2008/0301732 | A1 | 12/2008 | Archer et al. |
| 2010/0122303 | A1 | 5/2010 | Maloney |
| 2010/0241699 | A1 | 9/2010 | Muthukumarasamy et al. |
| 2010/0251304 | A1 | 9/2010 | Donoghue et al. |
| 2011/0320380 | A1 | 12/2011 | Zahn et al. |
| 2012/0030587 | A1 | 2/2012 | Ketkar |
| 2012/0054666 | A1 | 3/2012 | Baird-Smith et al. |
| 2012/0095833 | A1 | 4/2012 | Bleyl |
| 2012/0150659 | A1 | 6/2012 | Patel et al. |
| 2012/0167132 | A1* | 6/2012 | Mathews .......... H04N 21/25808 725/32 |
| 2012/0174159 | A1 | 7/2012 | Arte et al. |
| 2012/0204201 | A1 | 8/2012 | Cassidy et al. |
| 2013/0290233 | A1 | 10/2013 | Ferren et al. |
| 2014/0067998 | A1* | 3/2014 | Garcia ................ H04L 65/4084 709/217 |
| 2016/0142774 | A1 | 5/2016 | Sayyadi-Harikandehei |
| 2016/0212493 | A1 | 7/2016 | Phadnis |
| 2017/0078750 | A1 | 3/2017 | Ashkan et al. |
| 2017/0094332 | A1 | 3/2017 | Thomas et al. |
| 2017/0094343 | A1 | 3/2017 | Greene |
| 2017/0164063 | A1 | 6/2017 | Lewis et al. |
| 2017/0171580 | A1 | 6/2017 | Hirsch et al. |

FOREIGN PATENT DOCUMENTS

| | | |
|---|---|---|
| WO | 0207433 | 1/2002 |
| WO | 03056821 | 7/2003 |

OTHER PUBLICATIONS

Phadnis, Atul, U.S. Appl. No. 15/111,777, filed Jul. 14, 2016, 45 pages.

International Search Report and Written Opinion for Int. App. No. PCT/IN2015/000023, dated Oct. 5, 2015.

Ardissono et al. "User Modeling and Recommendation Techniques for Personalized Electronic Program Guides," In: Personalized Digital Television. Human-Computer Interaction Series, vol. 6. Springer, Dordrecht (2004), 27 pages.

Weiβ et al. "A User Profile-Based Personalization System for Digital Multimedia Content," Digital Interactive Media in Entertainment and Arts (DIMEA) 2008, pp. 281-288, Sep. 10, 2008, 8 pages.

Zimmerman et al. "TV Personalization System," In: Personalized Digital Television. Human-Computer Interaction Series, vol. 6. Springer, Dordrecht (2004), 29 pages.

European Patent Office, "Communication Pursuant to Rules 70(2) and 70a(2)," issued in connection with European Patent Application No. 15743973.8, dated Jun. 27, 2017, 1 page.

European Patent Office, "Extended European Search Report," issued in connection with European Patent Application No. 15743973.8, dated Jun. 9, 2017, 9 pages.

Wikipedia, "Electronic Program Guide," dated Jan. 10, 2014, retrieved from [https://en.wikipedia.org/w/index.php?title=Electronic_program_guied&oldid=590113618] on Aug. 9, 2017, 5 pages.

* cited by examiner

METHOD AND SYSTEM FOR CUSTOMER MANAGEMENT

CROSS REFERENCES TO RELATED DISCLOSURES

The present disclosure is a national stage entry of PCT/IN2015/000161, filed Apr. 6, 2015, and claims priority to IN 1259/MUM/2014, filed Apr. 2, 2014. The full disclosures of PCT/IN2015/000161 and IN 1259/MUM/2014 are incorporated herein by reference.

BACKGROUND

A. Technical Field

The present disclosure relates to a method and system for customer management, more particularly the disclosure relates to delivery of a content rich data platform with search, and user interactive features to service providers to enhance the service provider's ability to manage customers.

B. Background of the Invention

Television is, for the most part, a broadcast medium. That is, our television sets mostly just receive data and hardly ever send any feedback or response communication. This communication channel is mostly one way.

However, with advent of technology the reception at the television set has become interactive through modern receiving devices embedded and/or linked to the television set.

The competition in the TV programming industry has resulted in a general improvement in the service in the entire industry. However, the TV industry is a two-sided market where advertising prices are typically set by TV channels while viewer prices are set by distributors (e.g. cable operators). The latter implies that the distributors partly internalize the competition between the TV channels. We nonetheless find that a shift to a market structure might increase joint industry profits.

With increased competition in this space, number of features, HD channels, interactivity and better services are now a given.

However, the packages are not clearly defined and have more chance of confusion as it does not clearly disclose the channels included, i.e. the channels of each genre—news, sports, infotainment, music, lifestyle, movies and general entertainment and their respective costs. This opaque bundle channel structure of each service provider makes it difficult for the viewer to choose appropriate service provider/channel operator or the channel packs offered by them. The complexity per operator in terms of the number of packs, add on packs, a-la-carte channels, value added services as well as PPV and VOD content makes it a daunting task for the user/consumer. The compounding effect of all these factors will typically turn into a multitude of permutations and combinations resulting in consumer confusion and chaos.

There is no simple way to determine which is better for the consumer by a service provider/operators—many of them offer similar services and performance. However, the service provider/operator may offer the consumers channel/program packs characterized on the basis of entry price point, various channel packages, monthly costs, multi-room discounts and HD services.

The service provider/operators may land-up trying to entice consumers by advertising a large number of available channels. However it is important for the consumer to have channels/programs of his preference in the package.

Hence it becomes difficult for the service provider/operators to choose the channel and program to constitute a package as the total number of channels on offer matters little if the channels the consumer really wants to watch are not available. It is important for the service provider/operators to know which are the channels that are relevant for the consumer, how much extra will the service provider/operators be able to charge for specialized packages, how easily and how often can consumer switch between plans, if a new channel is added, will it automatically get added to consumer's existing package etc.

The available technologies cannot identify the user choices and preference for Channel/Program Viewing behaviour across multiple platforms.

Another challenge is proliferation of number of channels and program across every digital platform.

The growing volumes of increasingly complex data associated such as schedules, ratings, user configuration information, channel lists, multimedia content corresponding index presents a unique problem for digital platforms to create opportunities for sampling new program/channel content.

Any or all of the present systems and method thereof are not capable of capturing and managing user choices and preference for program/channel Viewing behaviour across multiple platforms Any or all of the present systems and method thereof are not capable of creating multi-platform in-depth user profiling and preference clustering Any or all of the present systems and method thereof are not capable of linking user preferences with his subscriptions Any or all of the present systems and method thereof fails provide user with access and allow the user to manage both their Account Details and Viewing Preferences from any single platform.

For the reasons stated above, which will become apparent to those skilled in the art upon reading and understanding the specification, there is a need in the art for a system and method for delivery of a content rich data platform with search, and user interactive features to service providers to enhance the service provider's ability to manage customer that is scalable and independent/compatible to new technology platforms, uses minimum resources that is easy and cost effectively maintained and is portable and can be deployed anywhere in very little time.

SUMMARY

A method and system for subscription and customer management is disclosed. More particularly the disclosure relates to delivery of a content rich data platform with search, and user interactive features to service providers to enhance the service provider's ability to manage customers. The system receives user subscription data indicative of at least one user transaction i.e. buy packs, add-ons, ALC, recharge etc., The system also receives user activity data indicative of at least one user activity such as but not limited to browse, favourite, reminder, search, share, discuss and actively manages and records the plurality of activities of the plurality of users. Each user activity such as but not limited to program browse, program favourite, set reminder, search, buy, upgrade, check-in, share, discuss, watch video are assigned weightages. The system receives data from the different accounts of a user, creates a unique universal identity and maps the accounts to a single system by the unique universal identity to link each user's data across all devices and platforms. The system also receives the behaviour of a plurality of social media contacts associated with the user across social network accounts. The viewer preference data is generated based on the user subscription info received and user activities, and behaviour of the plurality of social media contacts associated with the user, if any. The user activity and transaction data and accordingly the preference columns of the viewer dataset (11064) at the viewer preference manager are updated and a Recommended List of channels and programs based on User preference is generated. The resultant list of User-Preferences is further processed to generate list of recommended packs, a la carte channels, VOD etc. which is delivered to users, service providers, and broadcasters. The system also generates inputs for the service providers and broadcasters regarding the user preference and also generates data depicting the trending and popular program and channels based on the info received from the social media contacts of a subscriber of the multiple subscribers across various platforms.

Some embodiments of the present disclosure involve a method. The method may involve receiving, for each subscriber of multiple subscribers to a digital content distribution service: (i) first data indicative of a content consumption pattern of the subscriber, (ii) second data indicative of a current subscription of the subscriber and (iii) third data indicative of a behaviour of a plurality of social media contacts associated with the subscriber. The method may also involve, for each subscriber of the multiple subscribers, determining, based at least in part on the first data, a content preference of the subscriber. The method may also involve, for each subscriber of the multiple subscribers, determining recommended digital content which is: (i) available for distribution through the digital content distribution service, (ii) associated with the determined content preference of the subscriber, and (iii) not included in the current subscription of the subscriber indicated by the second data.

Some embodiments of the present disclosure involve a method. The method may involve storing, for each subscriber of multiple subscribers to a digital content distribution service: (i) first data indicative of a content consumption pattern of the subscriber, and (ii) second data indicative of a current subscription of the subscriber and (iii) third data indicative of a behaviour of a plurality of social media contacts associated with the subscriber. The method may also involve sending a request for recommended digital content for one or more of the multiple subscribers. The request may include the first data, second data and third data for each of the one or more of the multiple subscribers. The method may also involve, in response to sending the request, receiving data indicative of recommended digital content for each of the one or more of the multiple subscribers.

DETAILED DESCRIPTION OF THE INVENTION

Figure 1:
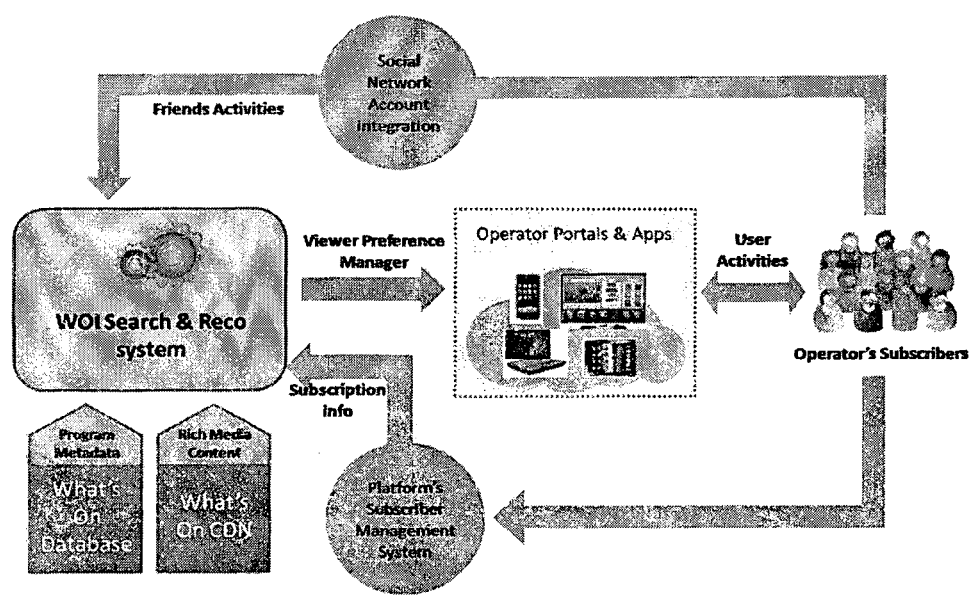
FIG. 1 is an example system flow diagram, in accordance with at least one embodiment.

The disclosure described herein is directed to perform effective customer management through delivery of a content rich data platform with search, and user interactive features to service providers to enhance the service provider's ability to manage customer.

The embodiments herein provide a method and system for delivery of a content rich data platform with search, and user interactive features to service providers to enhance the service provider's ability to manage customer. Further the embodiments may be easily implemented in various Sale management structures. The method may also be implemented as application performed by a stand alone or embedded system.

The disclosure described herein is explained using specific exemplary details for better understanding. However, the disclosure disclosed can be worked on by a person skilled in the art without the use of these specific details.

References in the specification to "one embodiment" or "an embodiment" means that a particular feature, structure, characteristic, or function described in connection with the embodiment is included in at least one embodiment of the disclosure. The appearances of the phrase "in one embodiment" in various places in the specification are not necessarily all referring to the same embodiment.

Hereinafter, the preferred embodiments of the present disclosure will be described in detail. For clear description of the present disclosure, known constructions and functions will be omitted.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

Parts of the description may be presented in terms of operations performed by a computer system, using terms such as data, state, link, fault, packet, FTP and the like, consistent with the manner commonly employed by those skilled in the art to convey the substance of their work to others skilled in the art. As is well understood by those skilled in the art, these quantities take the form of data stored/transferred in the form of electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded. For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium. Moreover, such processing system and/or data storage may be implemented using a single computer system or may be distributed across multiple computer systems (e.g., servers) that are communicatively linked through a network to allow the computer systems to operate in a coordinated manner.

According to an embodiment, the method and system for delivery of a content rich data platform with search, and user interactive features to service providers to enhance the service provider's ability to manage customers is in accordance to the operator and/or service provider devices compatible format and to benefit across multiple platforms.

As the number of channels and programs proliferate on digital platforms, content search and discovery of programmes & channels becomes more and more cumbersome. As search & discovery of channels/programs becomes difficult, user repertoire starts getting limited to a few familiar channels & programs. Users are, as we know, program loyal, and not particularly channel loyal. This presents a unique problem for digital platforms to create opportunities for sampling new program/channel content.

With the rapid proliferation of Connected Devices on high speed data networks, this can be utilized to capture the desired user insights to drive appropriate recommendations at a program level to each user.

As per the preferred embodiment, the system and the method thereof of will enhance the service provider's ability to sell channels and packs to the users, hence enhancing their revenue. Through the user preferences driven recommendations via the connected devices As per one embodiment, the search and recommendation system may also enhance consumer management regionally based on user preferences and channel/program popularity. The system and the method thereof helps service providers to align with broadcasters and provide premium digital content which let users engage with channels/programs directly, hence the opportunity for additional source for revenue.

As per one embodiment, a plurality of Search & Recommendations modules are deployed at the systems of service providers.

As per one embodiment, at least one user preferences and liking are captured from the user activities on the various/multiple user interface systems.

In accordance to an embodiment, the system and method thereof provide an integrated platform to service providers where users can access their account details as well as do search, discover, explore and consume channel/program content. On the other hand it helps the service provider to better understand its users/subscribers by capturing user preferences.

Turning now to FIG. 1, an example system flow diagram is provided. As depicted in the diagram, a Search & recommendation system receives data regarding plurality of user's/subscriber's TV preference from at least one operator set-top-boxes, portals, apps or any other connected devices. Data relative to the plurality of user's/subscriber's activities and transactions in the form of subscription info is received from at least one service provider platform's subscriber management system. The system receives data indicative of behaviour of social media contact(s) from one or more social media platforms (e.g., for friends activities associated to a subscriber of the multiple subscribers across various social media platforms). The system also extracts existing plurality of operator's users data and viewer preference(s). The system processes the data to generate at least one recommendations list. These personalized recommendations are delivered to the user(s), service provider(s) and/or broadcaster(s). The system also generates inputs for the service providers and broadcasters regarding the user preference and also generates data depicting the trending and popular program and channels based on the info received from the social media contacts of the subscriber.

Figure 2:
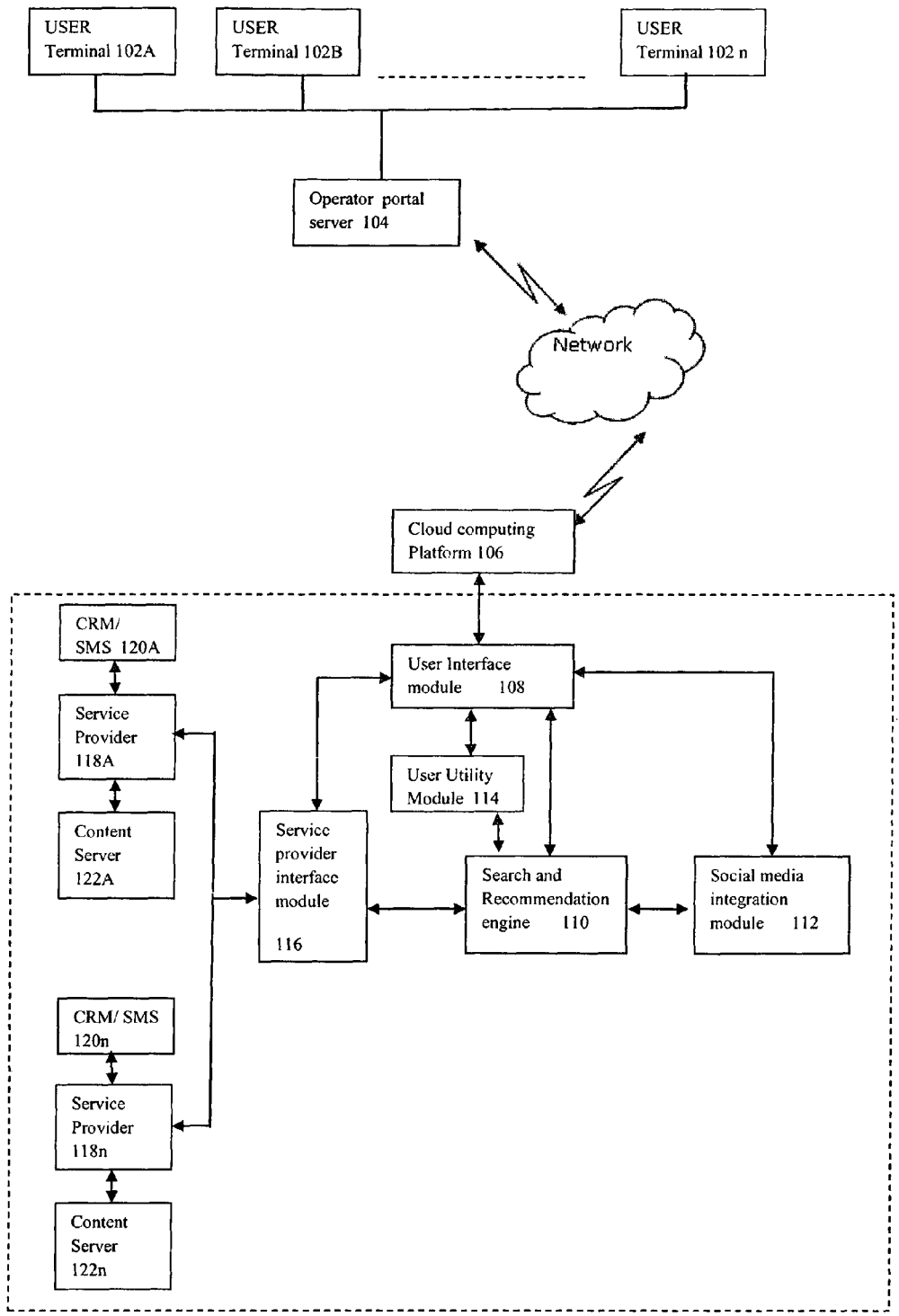
FIG. 2 is a block diagram of the system having Search & recommendation engine (110) integrated with social media integration module (112) and SMS/CRM system (120) of the Service provider.

Referring now to the drawings and in particular to FIG. 2, Included in the system are a plurality of user terminals (102) (102), at least one server (104) connected to the plurality of user terminals (102), at least one cloud computing platform (106) connecting at least one server (104) over at least one network and a customer management system connected to the cloud computing platform (106). A customer management system comprises: a User Interface Module (108) configured to fetch user data from multiple platforms such as but not limited to Operator Set-top-box, Portals, Apps etc.; a social media integration module (112) configured to integrate plurality of social network account of a user, extract the activity data of the user on social network account(s), extract behaviour of plurality of social media contacts associated to a subscriber of the multiple subscribers across various social media platforms for e.g. friends activities; a User utility Module (114) configured to offer classified utility such as TV guide, channel schedule, program details, setting reminders, channel and program favouriting, ratings, previews and trailers, full content videos, search, social TV graph, friend's activities, recharge, pack upgrade, channel buy, etc.; a search & recommendation engine (110) configured to generate user-preference and social activity driven recommendations; a Service provider interface module (116) configured to facilitate integration with the at least one SMS/CRM module (120) of the at least one Service Providers and push the at least one generated recommendation to the at least one user interactive platforms such as but not limited to Operator Portals, Apps used by the user; at least one service provider server (118) connected to the at least one cloud computing platform (106) through service provider interface module (116) to interact with the plurality of user terminals (102); at least one Content server (122) and an Integrated database containing the listings metadata and plurality of user terminals (102) access by plurality of users. The system authenticates the user and classifies it as consumer and service provider through the User Interface Module (108). The system captures user transactions e.g. buy packs, add-ons, a la carte, recharge etc. and user activities such as but not limited to browse, favourite, reminder, search, share, discuss. The system receives data from the different accounts of a user, creates a unique universal identity and maps the accounts for the user to a single system by the unique universal identity to link each user across all devices and platforms. The system thus consolidates a user's behaviour from all devices and platforms and builds a user profile across set-top-box, portals, apps, etc wherein the profile info includes, but is not limited to, name, age, gender, location, lifestage, device used, etc. The at least one content library and metadata details are extracted from the at least one integrated database system and are provided for the analysis. The at least one user profile and at least one subscription data is extracted from the at least one SMS/CRMS (120) of the at least one service providers and is provided for the analysis. The system through social media integration module (112) integrate plurality of social network account of a user, extract the activity data of a user on social network account, extract behaviour of plurality of social media contacts associated to a subscriber of the multiple subscribers across various social media platforms for e.g. friends activities, and provides the behaviour of plurality of social media contacts associated with the subscriber to the Search and recommendation engine (110) of the system. A plurality of parameters based on which the analysis is to be performed are captured through at least one Parameters register bank (11010). The plurality of parameters may be classified into plurality of sub categories such as User analytics where count of plurality of user and plurality of user demographics such as but not limited to user location, user preference, and TV viewing language forms the parameters. In another subcategory as Usage Analytics a plurality of user logins count, viewing history, search pattern, user action analysis such as browse, favourite, reminders, check-ins etc. are the plurality of parameter listed. In yet another subcategory Transactional analytics, the subcategory Transactional analytics includes ALC sales analysis, pack upgrades, subscription pattern, sales pattern are the parameters listed. The at least one user subscription info and the at least one transaction history data is captured from the at least one SMS of the at least one service providers. Also, data regarding at least one earlier recommendation made to the user and the selection of at least one packs, channels/programs by the user from the at least one earlier recommendation is captured from the at least one SMS of the at least one service provider. At least one electronic program guide metadata is also extracted from the at least one content servers (122) of the at least one service providers. Also, Operator business Rules are extracted from the at least one SMS of the at least one service provider through service provider access module. Operator business Rules are operator defined objectives and goals which it wishes to achieve. We apply Operator Business Rules to the comparison/filtration process of recommendations to be shown to the user, so that the recommendations and sales are in-line with the Operator business goals. These can change from case to case and time to time. Operator Business Rules being applied to the recommendations engine includes but not limited to Pack Management, A-la-carte pricing of channels, Schemes and Offers for long-term subscription, multiple subscriptions, advance payments, Up sell unsubscribed channels during upgrades, recharges, Promoting VOD content or Catch-up TV, Promoting and pushing specific channels, Upgrade Rules—Pushing Product upgrades, Pack Upgrades, Long-term pack upgrades.

Figure 3:
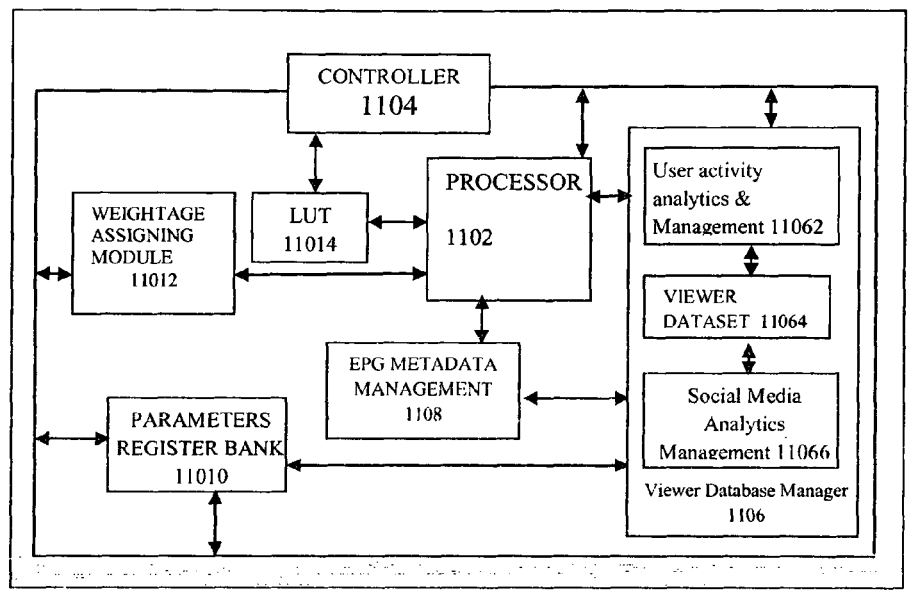
FIG. 3 is a Block diagram of Search & recommendation engine (110)

As per FIG. 3, The Search & recommendation engine (110) comprises of a Controller (1104) configured to initialize and synchronize operations, a Processor (1102) configured to perform various operations, an EPG metadata management module (1108) containing the data relating to various channels, programs, etc., a Viewer database manager module (1106) containing the data relating to individual users, a Parameters register bank (11010) for dynamically accessing data, an LUT (11014) wherein classification identifiers are stored, a User activity analytics and management Module (11062) configured to manage and analyse users activity, a social media analytics and management module configured to manage and analyse social media activity information of plurality of social media accounts of a user, Weightage module (11012) configured to assign weightage to various Channels and programs.

Figure 4:
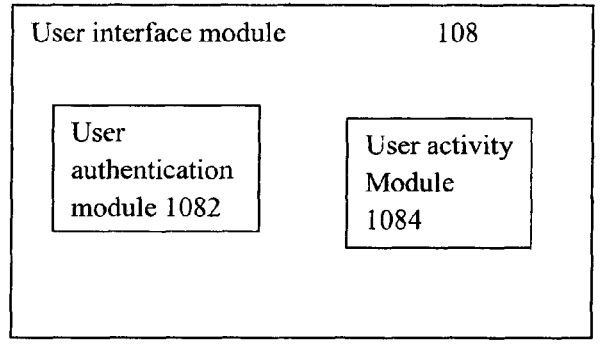
FIG. 4 is a Block diagram of User Interface Module (108).

As per FIG. 4, the User Interface Module (108) comprise of User authentication module (1082) for registering, authenticating user, classifying a user as consumer or service provider and providing access to the authenticated user and a User activity module (1084) for capturing user activities such as recharge, pack upgrade, channel buy, Search, channel/program schedules, set reminders, set remote recording, follow favourite programs and channels, preview & consume program promos/content across various platforms.

Figure 5:
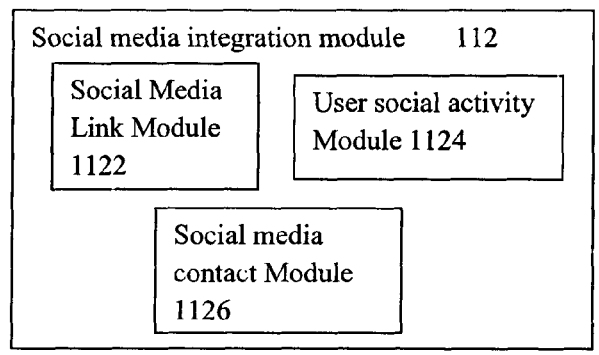
FIG. 5 is a Block diagram of Social media integration module (112).

As per FIG. 5, the social media integration module (112) comprise of Social media link module (1122) to establish and maintain data link to the plurality of social networking accounts of a user wherein the Social media link module (1122) understand the social network data and structure formats and establish compatible communication to extract the data from the plurality of social networking accounts associated with a user, a User social activity module (1124) configured to extract a user's activity data through the communication link established by the Social media link module (1122), a Social media contact module (1126) configured to extract the details of the social contacts associated and available at the plurality of social networking account of a user and extract the behaviour of the plurality of social media contacts associated with the user, and provides data indicative of the extracted behaviour to the Search and recommendation engine (110) of the system. For example, the Social media contact module (1126) may extract data indicative of social media activity for contacts identified for a particular user, such as contacts, groups joined and/or followed, and/or other indications of content preference(s) associated with activity undertaken via various social media platform.

The recommendation engine (110) of the system receives through the at least one user activity analytics and management module (11062) of viewer database manager module (1106) at least one user transaction i.e. buy packs, add-ons, ALC, recharge etc. and the at least one user activity such as but not limited to browse, favourite, reminder, search, share, discuss and actively manages and records the plurality of activities of the plurality of user respectively by classifying the plurality of activities respective to plurality of users. The recommendation engine (110) of the system also receives details of the social contacts associated and available at the plurality of social networking account of a user and behaviour of the plurality of social media contacts associated with the user of the multiple users across various social media platforms for e.g. friends activities and records the plurality of activities of the plurality of social contacts respectively by classifying the plurality of activities respective to plurality of social contacts and the plurality of platform from where they are captured.

The working of the Viewer Database Management module as described herewith is depicted through FIG. 7a to FIG. 7e.

The at least one user activity and management module of the at least one viewer database manager module (1106) is configured to extract analytical data (7a07) of at least one program, at least one channel, the programs or the channels which are subject matter of the at least one user's activity, behaviour, preferences selected or viewership offered by the user. For example, the user activity and management module may extract analytical data of channel(s) and/or program(s) viewed by the user. The extracted analytical data can include, but is not limited to, type of channel (e.g., genre), the most preferred program on channel, geography (e.g., time zone, local interests), etc.

The at least one user activity and management module of the at least one viewer database manager module (1106) is configured to extract the metadata of plurality of programs, plurality of channels (7a08), which are subject matter of the at least one user's activity, behaviour, preferences selected or viewership offered by the user wherein extracted metadata of the plurality of programs, plurality of channels includes but not limited to actor, director, theme, language, genre. Singer, production house, plot, theme, era, moods of the program etc.

The at least one user activity and management module of the at least one viewer database manager module (1106) is configured to link (7a09) extracted analytical data and extracted metadata of a plurality of programs and/or plurality of channels, which are subject matter of the at least one user's activity, behaviour, preferences selected or viewership offered by the user. The extracted analytical data and metadata of the plurality of programs and/or plurality of channels are linked to the user profile thus generating user preference data. For instance, the extracted analytical data and metadata may be used as a basis for generating user preference data such as Preferred genre (e.g., action, romance, drama, sports), preferred content (e.g., actor(s), director, producer(s), studio(s)), Preferred language (e.g., English, Hindi, Tamil, French, etc.) theme of his/her liking (e.g. (Real life incidents, Sports Victories, Superhero, etc.) etc.

The at least one user activity and management module of the at least one viewer database manager module (1106) is configured to extract analytical data (7a05) of at least one program, at least one channel, the programs or the channels which are subject matter of the at least one user's activity, behaviour, preferences selected or viewership offered by the user over time period, the time period that can be configured (7a03) through specified duration wherein extracted analytical data includes but not limited to type of channel, the most preferred program on channel, geography etc.

The at least one user activity and management module of the at least one viewer database manager module (1106) is configured to extract the metadata of plurality of programs, plurality of channels (7a06), which are subject matter of the at least one user's activity, behaviour, preferences selected or viewership offered by the user over time period, the time period that can be configured (7a04) through specified duration wherein extracted metadata of the plurality of programs, plurality of channels includes but not limited to actor, director, theme, language, genre. Singer, production house, plot, theme, era, moods of the program etc.

The at least one user activity and management module of the at least one viewer database manager module (1106) is configured to link (7a10) extracted analytical data and extracted metadata of a plurality of programs, plurality of channels, which are subject matter of the at least one user's activity, behaviour, preferences selected or viewership offered by the user over time period, the time period that can be configured through specified duration wherein extracted analytical data and metadata of the plurality of programs, plurality of channels are linked to the user profile and generate information regarding changes in the likes/dislikes of a user by tracking user activities through various time periods over the day-to-day span and the life span of the already subscribed selections of the user.

The at least one user activity and management module of the at least one viewer database manager module (1106) is configured to link (7a10) extracted analytical data and extracted metadata of at plurality of programs, plurality of channels, which are subject matter of the at least one user's activity, behaviour, preferences selected or viewership offered by the user over time period, the time period that can be configured through specified duration wherein extracted analytical data and metadata of the plurality of programs, plurality of channels are linked to the user profile and generate information regarding user's moods in real time based (7a11) on the time stamped capture of the user behaviour, preferences or the viewership exhibited by the user.

The at least one user activity and management module of the at least one viewer database manager module (1106) is configured to link (7b07) extracted analytical data (7b03, 7b05) and extracted metadata (7b04, 7b06) of at plurality of programs, plurality of channels, which are subject matter of the at least one user's activity, behaviour, preferences selected or viewership offered by the user over multiple devices used by the user that can be configured through same login information wherein extracted analytical data and metadata of the plurality of programs, plurality of channels are linked (7b08) to the user profile and generate information regarding the likes/dislikes of a user across various devices (7b10) by tracking user activities through same login info of the user over multiple devices used by the user and also and generate information regarding user's moods (7b09) of viewership across various devices used by the user.

The at least one social media analytics management module (11066) of the at least one viewer database manager module (1106) is configured to extract analytical data (7c05) of at least one program, at least one channel, the programs or the channels which are subject matter of the at least one user's social activity, behaviour, preferences selected or viewership offered by the user or the activity, behaviour, preferences selected or viewership offered by the plurality of social contacts of the user from the various social media platforms to which the user is associated with, wherein extracted analytical data includes but not limited to type of channel, the most preferred program on channel, geography etc.

The at least one social media analytics management module (11066) of the at least one viewer database manager module (1106) is configured to extract the metadata of plurality of programs, plurality of channels (7c06), which are subject matter of the at least one user's social activity, behaviour, preferences selected or viewership offered by the user or the activity, behaviour, preferences selected or viewership offered by the plurality of social contacts of the user from the various social media platforms to which the user is associated with, wherein extracted metadata of the plurality of programs, plurality of channels includes but not limited to actor, director, theme, language, genre. Singer, production house, plot, theme, era, moods of the program etc.

The at least one social media analytics management module (11066) of the at least one viewer database manager module (1106) is configured to link (7c07) extracted analytical data and extracted metadata of at plurality of programs, plurality of channels, which are subject matter of the at least one user's social activity, behaviour, preferences selected or viewership offered by the user or the activity, behaviour, preferences selected or viewership offered by the plurality of social contacts of the user from the various social media platforms to which the user is associated with, wherein extracted analytical data and metadata of the plurality of programs, plurality of channels are linked to the user profile thus generating user preference data which includes but not limited to Preferred genre (e.g., action, romance, drama, sports), preferred content (e.g., actor(s), director, producer(s), studio(s)), Preferred language (e.g., English, Hindi, Tamil, French, etc.) theme of his/her liking (e.g. (Real life incidents, Sports Victories, Superhero, etc) etc.

The at least one social media analytics management module (11066) of the at least one viewer database manager module (1106) is configured to extract analytical data (7c03) of at least one program, at least one channel, the programs or the channels which are subject matter of the at least one user's social activity, behaviour, preferences selected or viewership offered by the user or the activity, behaviour, preferences selected or viewership offered by the plurality of social contacts of the user from the various social media platforms to which the user is associated with, over time period, the time period that can be configured (7c01) through specified duration wherein extracted analytical data includes but not limited to type of channel, the most preferred program on channel, geography etc.

The at least one social media analytics management module (11066) of the at least one viewer database manager module (1106) is configured to extract the metadata of plurality of programs, plurality of channels (7c04), which are subject matter of the at least one user's social activity, behaviour, preferences selected or viewership offered by the user or the activity, behaviour, preferences selected or viewership offered by the plurality of social contacts of the user from the various social media platforms to which the user is associated with, over time period, the time period that can be configured (7c02) through specified duration wherein extracted metadata of the plurality of programs, plurality of channels includes but not limited to actor, director, theme, language, genre. Singer, production house, plot, theme, era, moods of the program etc.

The at least one social media analytics management module (11066) of the at least one viewer database manager module (1106) is configured to link (7c08) extracted analytical data and extracted metadata of at plurality of programs, plurality of channels, which are subject matter of the at least one user's social activity, behaviour, preferences selected or viewership offered by the user or the activity, behaviour, preferences selected or viewership offered by the plurality of social contacts of the user from the various social media platforms to which the user is associated with, over time period, the time period that can be configured through specified duration wherein extracted analytical data and metadata of the plurality of programs, plurality of channels are linked to the user profile and generate information regarding changes in the likes/dislikes of a user (7c10) by tracking user activities through various time periods over the day-to-day span and the life span of the already subscribed selections of the user.

The at least one social media analytics management module (11066) of the at least one viewer database manager module (1106) is configured to link (7c08) extracted analytical data and extracted metadata of a plurality of programs, plurality of channels, which are subject matter of the at least one user's social activity, behaviour, preferences selected or viewership offered by the user or the activity, behaviour, preferences selected or viewership offered by the plurality of social contacts of the user from the various social media platforms to which the user is associated with, over time period, the time period that can be configured through specified duration wherein extracted analytical data and metadata of the plurality of programs, plurality of channels are linked to the user profile and generate information regarding user's moods in real time based (7c09) on the time stamped capture of the user behaviour, preferences or the viewership exhibited by the user.

The at least one social media analytics management module (11066) of the at least one viewer database manager module (1106) is configured to link (7d08) extracted analytical data (7d03, 7d05) and extracted metadata (7d04, 7d06) of a plurality of programs, plurality of channels, which are subject matter of the at least one user's social activity, behaviour, preferences selected or viewership offered by the user or the activity, behaviour, preferences selected or viewership offered by the plurality of social contacts of the user from the various social media platforms to which the user is associated with, over multiple devices used by the user that can be configured through same login information wherein extracted analytical data and metadata of the plurality of programs, plurality of channels are linked to the user profile and generate information regarding the likes/dislikes of a user across various devices (7d10) by tracking user activities through same login info of the user over multiple devices used by the user and also and generate information regarding user's moods (7d09) of viewership across various devices used by the user.

The at least one user activity analytics and management module (11062) of the at least one viewer database manager module (1106) is configured to provide the analysed and classified data to the at least one Processor (1102) of the recommendation engine (110).

The at least one social media analytics management module (11066) of the at least one viewer database manager module (1106) is configured to provide the analysed and classified data to the at least one Processor (1102) of the recommendation engine (110).

The at least one viewer database manager module (1106) is configured to extract the liking and disliking pertaining to each activity of the user by extracting the relative parameters/characteristic features of the program/channel. For e.g. From each user activity on a particular program/movie, the module extract its metadata and understands which actor, director, theme, language, genre of programs/movies is the user linking.

The at least one viewer database manager module (1106) is configured to create user clusters based on the analysed and classified data generated by the at least one user activity analytics and management module (11062) and the at least one social media analytics management module (11066) and provide the user cluster data to the at least one Processor (1102) of the recommendation engine (110).

The at least one Processor (1102) of the recommendation engine (110) analyze the data indicative of the subscriber's content preferences and behaviour of the plurality of social media contacts associated to a user across various platforms and their preference data to identify related and/or similar content. For instance, the programs in a subscriber's viewing history can each be associated with a genre (e.g., action, romance, drama, sports), source of the content (e.g., actor(s), director, producer(s), studio(s)), a language (e.g., English, Hindi, Tamil, French, etc.), Moods (Happy Ending, Revenge, Musical, etc), Plot (Alien attack, Bank Robbery, Heist, Love triangle, etc), Theme (Real life incidents, Sports Victories, Superhero, etc), Era (1950s, 1990s, 2000, etc), Content type (Original, Remake, Dubbed, etc), Trend, factor of decay, teams, time lines, and/or other factors that characterize the type of content viewed by the subscriber.

The at least one Processor (1102) of the recommendation engine (110) receives data regarding at least one earlier recommendation made to the user and selection of at least one packs, channels/programs made by the at least one user from the at least one earlier recommendation from the service provider access module. The at least one Processor (1102) of the recommendation engine (110) receives classified data regarding behaviour of the plurality of social media contacts associated to a user of the multiple users across various social media platforms for e.g. friends activities. A plurality of weightages defined for each behavioural pattern/activity are assigned to respective activities data received by the recommendation engine (110). The at least one Processor (1102) of the Recommendations engine also tracks the conversions happening from recommendations made to a user. User may either explore more about a recommendation which signifies interest towards the recommendation made OR may buy from a recommendation which is a pure conversion from recommendation to sale. Tracking these help improve user preferences and hence further improve recommendations for that user. Pluralities of weightages defined for each activity are assigned to respective activities data received by the recommendation engine (110). The Weightage module (11012) is configured to assign weightages. Each user activity such as but not limited to program browse, program favourite, set reminder, search, buy, upgrade, check-in, share, discuss, watch video, behavioural pattern of social contacts are assigned weightages. Weightages assigned to each parameter is not fixed and is configurable on the basis of market needs and operator rules. The high weightage may be given to more engaging actions and low weightages to less engaging actions. Weightages are reviewed and adjusted on a regular basis to adapt changes in technology or deployments on portals, set top boxes and apps. The weightages can be adjusted based on new parameters introduced or new platforms being launch. Based on the user subscription info received and user activities and preference data, if any, the viewer preference data has been generated. The user activity, social activity data and transaction data received is forced through the cognitive data analytics and interpretation, filter arbitration and mapping process. The process is executed by the recommendation engine (110) wherein the at least one Processor (1102) of the at least one recommendation engine (110) is designed as a cognitive categorisation system, arbitration filter and data mapper and configured to execute the at least one cognitive categorisation, arbitration and mapper state machine. The user activity and transaction data received and the data extracted from the at least one SMS/the at least one CRMS is forced through the at least one cognitive categorisation system, arbitration filter and data mapper, the result of which are used to assign genre, type, rating etc. to the user activity, social activity data and transaction data and accordingly the preference columns of the viewer dataset (11064) at the viewer database manager are updated. The received user activity, social activity data and transaction data and the data extracted from the at least one Integrated database is forced through the at least one cognitive categorisation system, arbitration filter and data mapper, the result of which are used to assign genre, type, rating etc. to the user activity, social activity data and transaction data and accordingly a preference column of at least one viewer dataset (11064) at the at least one viewer database manager are updated. The received user activity, social activity data and transaction data and the data extracted from the subscriber viewing information is forced through the at least one cognitive categorisation system, arbitration filter and data mapper, the result of which are used to assign genre, type, rating etc. to the user activity, social activity data and transaction data and accordingly the at least one preference column of the at least one viewer dataset (11064) at the at least one viewer database manager are updated. The at least one Processor (1102) of the recommendation engine (110) then ranks the user liking/interest as per classification information, social media information and viewing information to determine preferences. The determined preferences are then processed with data regarding selection of at least one packs, channels/programs made by the user from the at least one earlier recommendation, plurality of operator business rules, the plurality of available programs and plurality of channels, the data for which is provided to the at least one Processor (1102) by the at least one EPG metadata management module (1108) to generate at least one Recommended List of plurality of channels and plurality of programs based on User preference. The resultant list of User-Preferences and Recommended List of Channels and programs is compared with the available plurality of subscription packs and subscribed pack. If the recommended pack is not the same as the at least one subscribed pack, then a preferred list of plurality of recommended packs is generated. However if the recommended pack is the same as the subscribed pack then a la carte channels, VOD etc. are recommended.

For example, for a user who likes sports, she performs search for football match on portal, comments on the football player's performances on the social networking portal etc. These activities are captured through the API at the service provider's portals and the social networking portals by the system through the at least one User Interface Module (108). The social media module captures the behaviour of the social contacts of the user across the social networking platforms wherein the majority of social contacts behavior suggests that they are more interested into ongoing cricket world cup series. The at least one Weightage module (11012) of the at least one recommendation engine 10) assigns the higher point weightage to the social networking portal and secondary weightage to the search. The at least one recommendation engine (110) extracts the user subscription info from the service provider database which indicates the user is subscribed to free news channels and free sports channels. The at least one recommendation engine (110) generates the preference data based on the info from the at least one service provider database. The at least one recommendation engine (110) assign the genre type to the activity as sports—cricket and execute the at least one cognitive categorisation system, arbitration filter and data mapper logic for the selection of preferred channel packs wherein the service provider is provided with the channel to be recommended to the user and user is proposed with a pack which includes channels telecasting the cricket world cup series which is of the genre sports of her preference.

Figure 6:
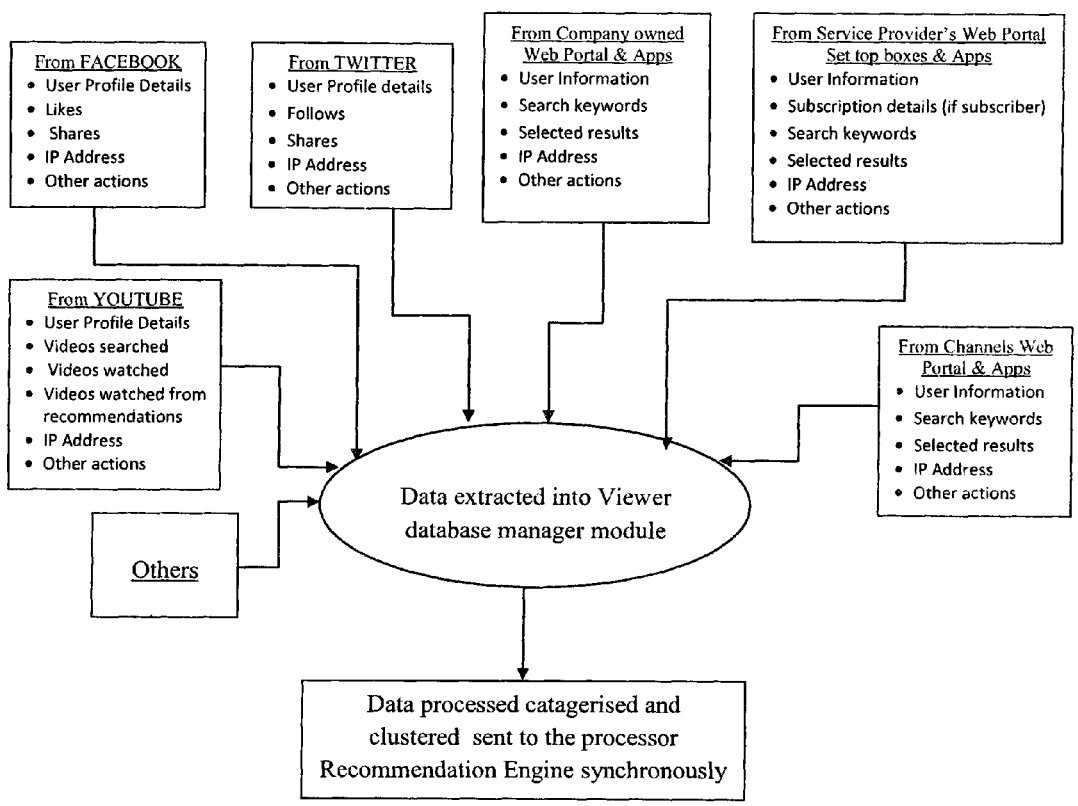
FIG. 6 describes the process of fetching data from various sources to provide as an input to the Viewer Database Management Module.
Figure 7A:
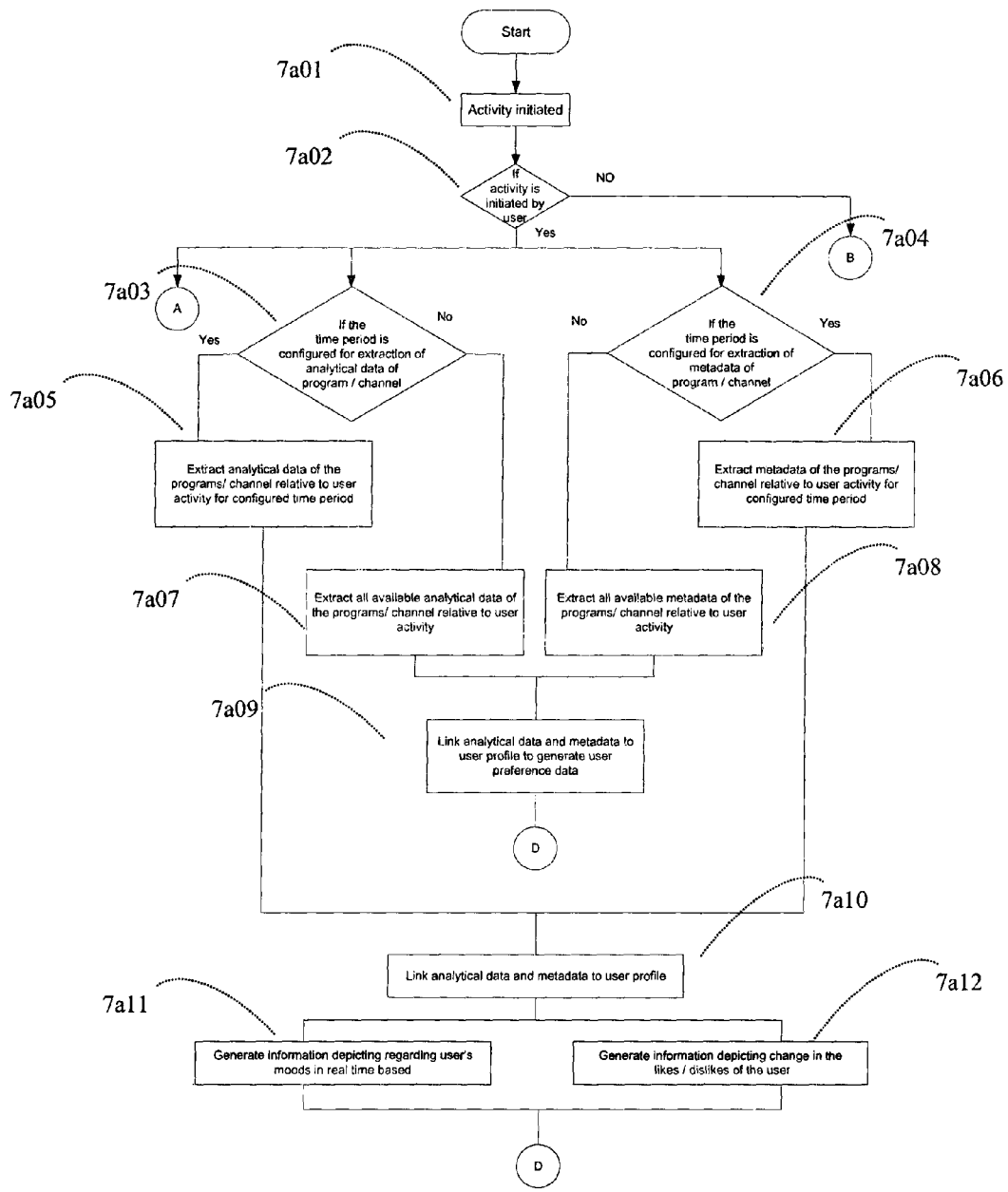
FIGS. 7*a*, 7*b*, 7*c*, 7*d* and 7*e* describes the working of Viewer database manager module (1106)
Figure 7:
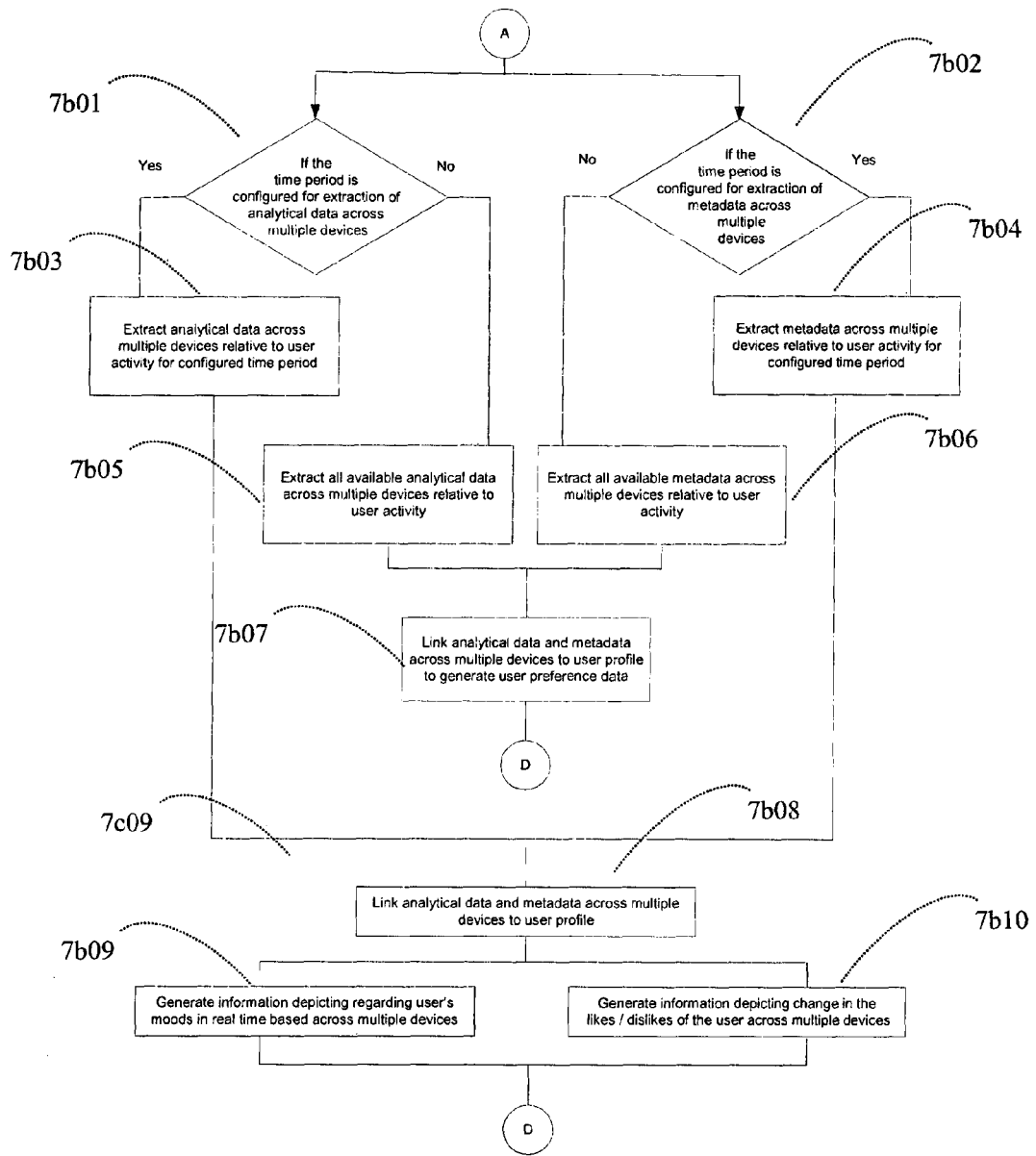
Figure 7C:
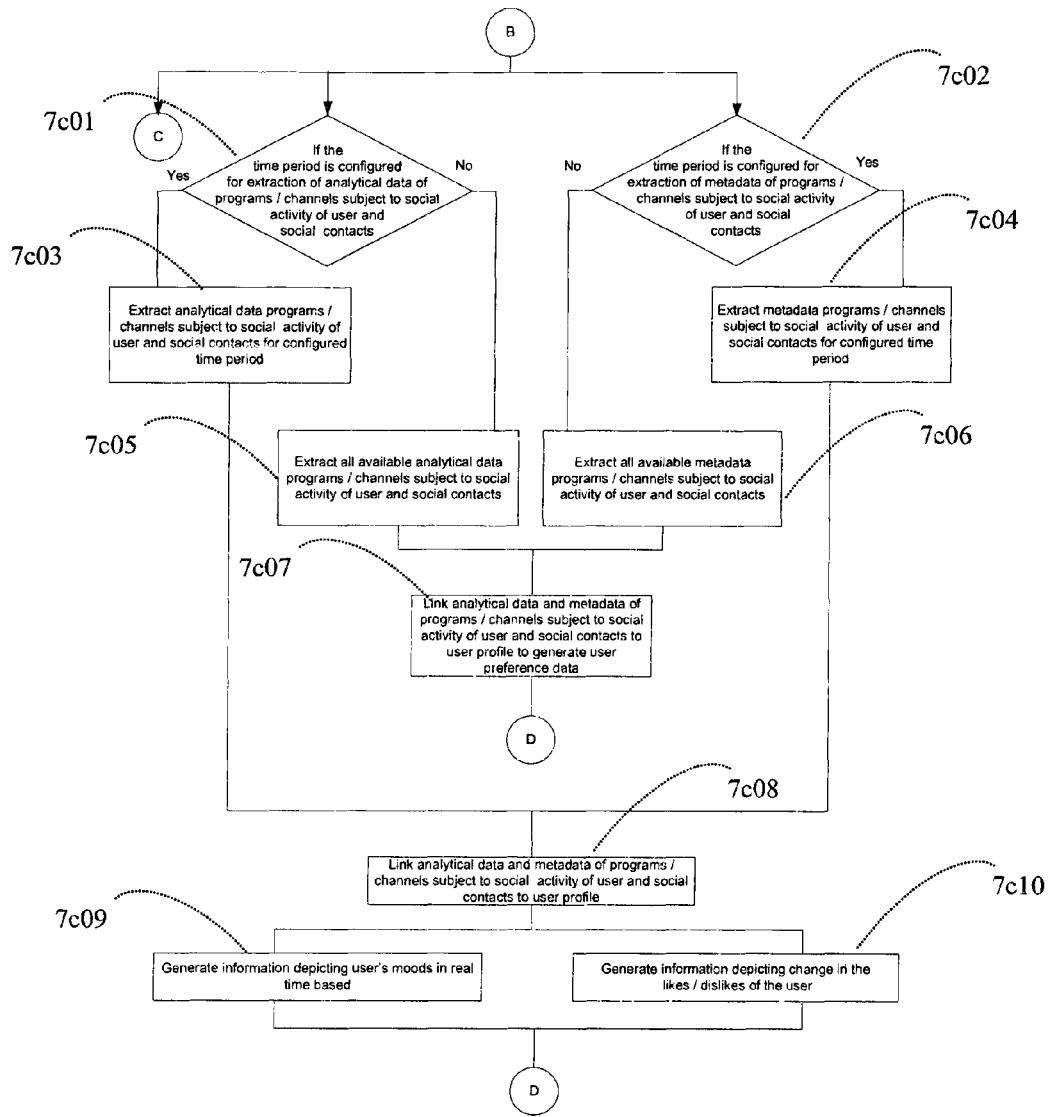
Figure 7D:
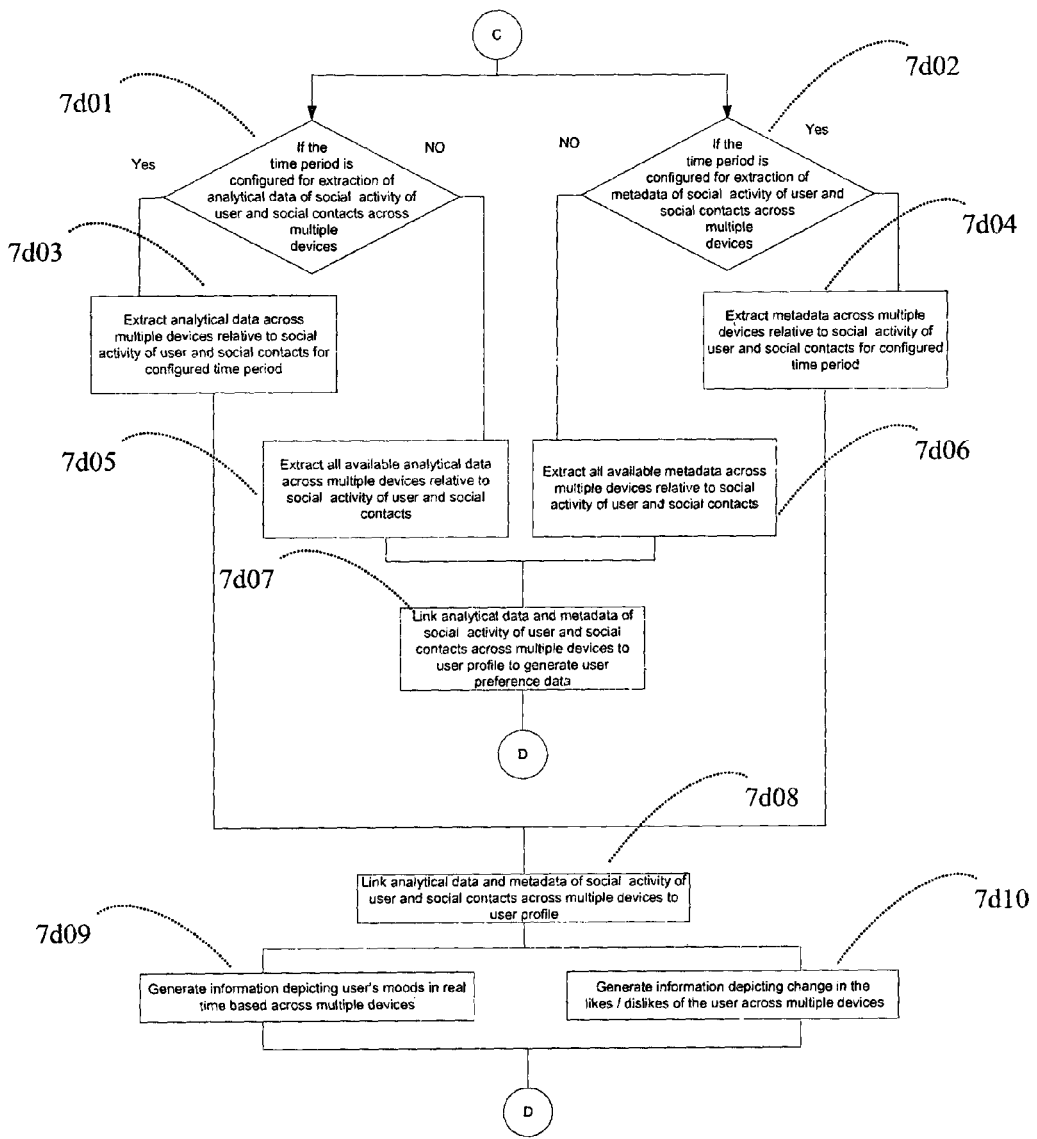
Figure 7E:
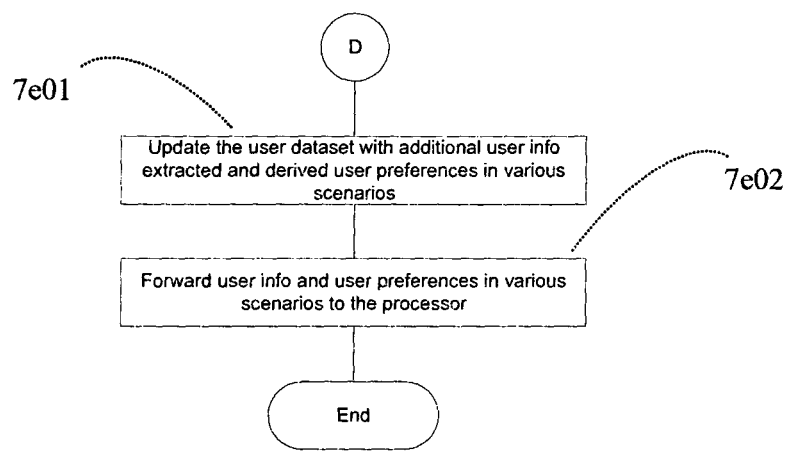

FIG. 6 describes the sources from which the at least one Viewer Database Manager extracts data. It extracts data from multiple interfaces for eg. Social Media websites like Facebook, Twitter, Youtube etc, Web portal and apps of Service Provider, WOI, and independent Channels etc. The metadata and relevant information of a User using any of these websites/web services is captured by the at least one Viewer Database Manager to be fed to the at least one Processor (1102) of the at least one Recommendation engine (110) for further processing. When a User accesses Facebook, his profile details, Likes, Shares etc. are captured. From Twitter the User profile details, follows, shares etc. are captured. From youtube, the profile details of a user, videos searched, videos watched, videos watched from recommended videos, etc. are captured. From the at least one Service Provider's Web portal and apps, whenever a User logs in, the User information, Subscription details (if a subscriber), search keywords, selected results, etc. are captured. Similarly when a user logs-in to the Web Portal and apps of EPG manager, the user information, search keywords, selected results etc. are captured. Also when a user accesses any of his/her social networking account, the details of the social contacts associated with the user's account are extracted. The behaviour of the plurality of social media contacts associated to a user across various platforms and their preference data is also extracted. Likewise, if a user logs-in the channels web portal or channels apps, user information, search keywords, selected results etc. are captured. All this captured data is processed, classified, clustered into a format acceptable and fed to the Processor (1102) of recommendation engine (110) for further processing.

As per one of the embodiment of the present disclosure, once a subscriber logs-in on the operator and/or Service provider portal, the system may capture data indicative of content preferences of the subscriber and/or currently subscribed content packages for the subscriber. For instance, the system may extract data for the subscriber such as personal details, subscribed pack, account balance and validity, etc.

As per one of the embodiment of the present disclosure, data indicative of subscriber content preferences is extracted, accessed and/or processed in real time. For instance, the subscriber's changes, transactions, and/or behaviours of social media contacts are captured in real time and used as a basis for generating real time content recommendations specific to that subscriber. As such, content recommendations provided to each subscriber may be based in part on the real time activities of the subscriber and/or the real time activities of social media contacts of the subscriber. In addition, the real time subscriber data can be mapped into the system and displayed personal account details to the subscribers or to the user on the user interface.

As per one of the embodiment of the present disclosure, the system and the method thereof map at least one subscriber/users likes and preferences against his subscriptions on the service provider's platform with the help of this integration.

As per one of the embodiment of the present disclosure, the system and the method thereof generate personalized recommendations (Programs, channels, Video on Demand, Movies, top-ups, pack upgrades, etc) based on the at least one subscriber/user activities and preferences, as well as current subscriptions.

In accordance to a preferred embodiment of the disclosure, the system and method thereof create an integrated interface, wherein the interface may be GUI of the system or a portal where a user can manage both his Account Details and Viewing Preferences from a single portal/system.

In accordance to an embodiment of the disclosure, the system and method thereof may provide users a more intuitive and engaging experience with features like Search, channel/program schedules, set reminders, set remote recording, follow favourite programs and channels, preview & consume program promos/content.

In accordance to an embodiment of the disclosure, the system and method thereof consolidate user's behaviour from all devices and platforms basis user's activities and build a user profile across set-top-box, portals, apps and other connected devices.

In accordance to an embodiment of the disclosure, different accounts of users like What's-On-India account, email account, social media accounts, and service provider accounts are mapped to a single system. Social Media account enables user to connect and follow their friend's activities thereby providing social preferences on the system.

In accordance to an embodiment of the disclosure, the system and method thereof may provide service providers with an integrated solution where users can access their account details, make transactions like recharge, top-up, upgrade, buy channels, etc. search, discover, explore, and consume channel/programs and other content In accordance to an embodiment of the disclosure, the system and method thereof can be deployed on any connected platform or device. It can be deployed on online portals like websites, mobile portals, social networking platforms, etc. And also on Mobile, Tablets, connected Set-top-boxes and Smart TVs as integrated Apps (compatible on all operating systems).

In accordance to an embodiment of the disclosure, the system and method thereof provide a direct user engagement platform to the service Providers.

As per one of the embodiment of the present disclosure, the system and the method thereof provide improved Content Discovery based on individual preferences to at least one subscriber/user.

Another example embodiment may involve a customer management service that is communicatively coupled to a digital content distribution service. The digital content distribution service may be implemented as a system of one or more servers that function to stream digital content to one or more subscribers via one or more communication networks (e.g., the internet, broadcast networks, etc.). Such content may be streamed in response to requests for that content (e.g., on demand content) and/or may be provided in accordance with a predetermined schedule (e.g., broadcast programming). Thus, among other features and subsystems, the digital content distribution service may include a customers management system, sources of content, and various portals for making that content available for viewing by subscribers. In some examples, the digital content distribution service may provide a set of content packages from which individual subscribers can elect to subscribe (i.e., purchase). Each such content package may include a combination of video content channels and/or on demand video content and may be grouped in accordance with various factors such as genre, language, cost considerations, etc. The customer management service may be implemented as a system of one or more servers that function to generate subscription recommendations for individual subscribers to the digital content distribution system.

For example, referring to FIG. 2, the digital content distribution system may include the service provider, and the customer management service that may include the recommendation engine (110) and one or more of the other modules within the dashed rectangle. Thus, in operation, the digital content distribution service may communicate with the customer management service to obtain personalized subscription recommendations for at least some of the subscribers to the digital content distribution service and then make purchasing recommendations to those subscribers on that basis. One such example subscription recommendation process is described below.

The digital content subscription service may compile and store data indicative of content preferences of each subscriber to the service (e.g., program viewing histories). For instance, while a given subscriber accesses the digital content distribution service via one or more viewing devices associated with that subscriber, the digital content distributions service may log interactions that relate to content portrayed on the subscriber's device, searches for content using the subscriber's device, and/or other indications of content preferred by the subscriber. The digital content subscription service can then send at least some data indicative of the content preferences of the subscriber to the customer management service along with data indicative of the current subscription of the subscriber.

At the customer management service, the data indicative of the subscriber's content preferences and also data indicative of behaviour(s) of social media contacts associated with the subscriber and their preference data can be analysed to identify related and/or similar content to recommend to the subscriber. For instance, the programs in a subscriber's viewing history can each be associated with a genre (e.g., action, romance, drama, sports), source of the content (e.g., actor(s), director, producer(s), studio(s)), a language (e.g., English, Hindi, Tamil, French, etc.), and/or other factors that characterize the type of content viewed by the subscriber. The various factors related to the subscriber's viewing history and/or other factors, such as a genre interest or sports team previously identified by the subscriber, behaviour of the plurality of social media contacts associated to a user across various platforms and their preference data are then combined to determine a content preference of the subscriber.

In some cases, the content preference(s) of the subscriber (e.g., the subscriber's content preference profile) may be determined by combining multiple factors and behaviour of the plurality of social media contacts associated with the subscriber across various platforms and their preference data and weighting each factor differently. For instance, content preference data based on viewing histories may be weighted in part based on the recency of the viewing history relative to other content preference data, behaviour of the plurality of social media contacts may be weighted in part based on the frequency of the comments relative to the genre type to other content preference data. Many other examples are also possible.

The content preference of the subscriber (or content preference profile) may then be compared against the available content distributed through the digital content distribution service to identify available content which is both: (i) available through the digital content distribution service, (ii) associated with the content preference of the subscriber, and (iii) not included in the subscriber's current subscription. For instance, the customer management service may first determine a degree of correspondence between the content preference determined for the subscriber and content categories of each of a set of subscription packages available through the digital content distribution service. As an example, a subscription package with a high degree of overlap between the content categories associated with the package and the content preference(s) determined for the subscriber will have a higher degree of correspondence than a subscription package with less overlap. The personalized subscription recommendation service may rank the available subscription packages based on their relative degree of correspondence with the subscriber's content preference(s). The personalized subscription recommendation service can then select one or more of the most highly ranked subscription packages as the subscription recommendation, and send an indication of the recommendation to the digital content distribution service. The customer management service can also send an indication of the particular subscriber to which the recommendation pertains so that the digital content distribution service can associate the received recommendation with the particular subscriber. The digital content distribution service can use the received recommendation as a basis for making a corresponding recommendation to the subscriber to purchase one or more additional subscription packages (e.g., via the portal of the digital content distribution service).

In addition, the customer management service may filter the set of available subscription packages to eliminate any subscription packages that the subscriber is already subscribed to. In other words, the customer management service may filter the subscription packages to generate a subset of subscription packages that includes only those subscription packages that are not included in the subscriber's current subscription. The customer management service can then select one of the subset of subscription packages as the subscription recommendation. In some examples, the set of available subscription packages may be filtered prior to determining the degree of correspondence between the subscriber's content preference(s) and the available subscription packages. As a result, the degree of correspondence may be determined only for those subscription packages that are not already included in the subscriber's current subscription, which saves computing resources and lowers processing time. Further, in some examples, the subscriber's current subscription packages may itself be used as a basis for determining the subscriber's content preferences. The customer management service may analyse a subscriber's current subscriptions and identify one or more similar packages as the subscription recommendation. For instance, the subscription recommendation for a subscriber that is currently subscribed to multiple sports-themed channels may be a package for additional sports-themed packages.

In some examples, the systems described herein may include one or more Processors, one or more forms of memory, one or more input devices/interfaces, one or more output devices/interfaces, and machine-readable instructions that when executed by the one or more processors cause the system to carry out the various operations, tasks, capabilities, etc., described above.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with FIGS. 1-7*e*.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

Further, while one or more operations have been described as being performed by or otherwise related to certain modules, devices or entities (e.g., the User Interface Module (108) or the Viewer database manager module (1106)), the operations may be performed by or otherwise related to any module, device or entity. As such, any function or operation that has been described as being performed by the device could alternatively be performed by a different server, by the Recommendation engine (110) platform, or a combination thereof. For instance, in one example, one server could generate and transmit a list of user activities for a particular user based on one or more content and/or viewing attributes associated with that user, and another server or user-associated terminal, such as one of the multiple platforms, could generate and display information associated with one or more items in the list of content for viewing by the particular user.

Further, the operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method comprising:
receiving, by a computing system, information indicative of one or more television viewing activities of a user;
receiving, by the computing system, information indicative of both first social media activity of a social media account of the user and second social media activity of one or more other social media accounts;
determining, by the computing system, respective weighted values for each of the one or more television viewing activities and for each of the first and second social media activities;
based on the determined weighted values, identifying, by the computing system, a video content package that includes television channels related to each of (i) the one or more television viewing activities of the user, (ii) the first social media activity of the social media account of the user, and (iii) the second social media activity of the one or more other social media accounts;
making, by the computing system, a determination of whether the user is subscribed to one or more of the television channels;
based on the determination, performing, by the computing system, an action, wherein if the determination is that the user is subscribed to one or more of the television channels, then the action comprises offering an a la carte list of the television channels to the user for purchase, and if the determination is that the user is not subscribed to one or more of the television channels, then the action comprises offering the video content package to the user for purchase.

2. The method of claim 1, wherein the one or more other social media accounts comprises a plurality of social media accounts across a plurality of social media platforms.

3. The method of claim 1, wherein the one or more other social media accounts are associated with the social media account of the user.

4. The method of claim 1, wherein the first social media activity or the second social media activity comprises posting a comment to a social media website, and wherein the comment references a particular television program.

5. The method of claim 1, wherein receiving information indicative of one or more television viewing activities of the user comprises receiving information indicative of a television subscription purchase history of the user.

6. The method of claim 1, wherein receiving information indicative of one or more television viewing activities of the user comprises receiving information indicative of a preferred television program genre of the user.

7. The method of claim 1, wherein receiving information indicative of one or more television viewing activities of the user comprises receiving information indicative of a television viewing history of the user.

8. The method of claim 1, wherein receiving information indicative of one or more television viewing activities of the user comprises receiving information indicative of a television program search command input by the user.

9. A method comprising:
receiving, by a computing system, information indicative of one or more television viewing activities of a user;
receiving, by the computing system, information indicative of both first social media activity of a social media account of the user and second social media activity of one or more other social media accounts;
determining, by the computing system, respective weighted values for each of the one or more television viewing activities and for each of the first and second social media activities;
based on the determined weighted values, identifying, by the computing system, a list of video content packages, wherein each of the video content packages includes one or more television channels related to each of (i) the one or more television viewing activities of the user, (ii) the first social media activity of the social media account of the user, and (iii) the second social media activity of the one or more other social media accounts;
for each of the video content packages, determining, by the computing system, whether the user is subscribed to at least one of the one or more television channels of the respective video content package;
for each of the video content packages, if the determination is that the user is subscribed to at least one of the one or more television channels of the respective video content package, then the computing system removing the respective video content package from the list of video content packages; and
offering, by the computing system, the list of video content packages to the user for purchase.

10. The method of claim 9, wherein the one or more other social media accounts comprises a plurality of social media accounts across a plurality of social media platforms.

11. The method of claim 9, wherein the one or more other social media accounts are associated with the social media account of the user.

12. The method of claim 9, wherein the first social media activity or the second social media activity comprises posting a comment to a social media website, and wherein the comment references a particular television program.

13. The method of claim 9, wherein receiving information indicative of one or more television viewing activities of the user comprises receiving information indicative of a television subscription purchase history of the user.

14. The method of claim 9, wherein receiving information indicative of one or more television viewing activities of the user comprises receiving information indicative of a preferred television program genre of the user.

15. The method of claim 9, wherein receiving information indicative of one or more television viewing activities of the user comprises receiving information indicative of a television viewing history of the user.

16. A computing system configured for performing a set of acts comprising:
receiving, by the computing system, information indicative of one or more television viewing activities of a user;
receiving, by the computing system, information indicative of both first social media activity of a social media account of the user and second social media activity of one or more other social media accounts;

determining, by the computing system, respective weighted values for each of the one or more television viewing activities and for each of the first and second social media activities;

based on the determined weighted values, identifying, by the computing system, a video content package that includes television channels related to each of (i) the one or more television viewing activities of the user, (ii) the first social media activity of the social media account of the user, and (iii) the second social media activity of the one or more other social media accounts;

making, by the computing system, a determination of whether the user is subscribed to one or more of the television channels;

based on the determination, performing, by the computing system, an action, wherein if the determination is that the user is subscribed to one or more of the television channels, then the action comprises offering an a la carte list of the television channels to the user for purchase, and if the determination is that the user is not subscribed to one or more of the television channels, then the action comprises offering the video content package to the user for purchase.

17. The computing system of claim 16, wherein the one or more other social media accounts comprises a plurality of social media accounts across a plurality of social media platforms.

18. The computing system of claim 16, wherein the one or more other social media accounts are associated with the social media account of the user.

19. The computing system of claim 16, wherein the first social media activity or the second social media activity comprises posting a comment to a social media website, and wherein the comment references a particular television program.

20. The computing system of claim 16, wherein receiving information indicative of one or more television viewing activities of the user comprises receiving information indicative of a television subscription purchase history of the user.

* * * * *